United States Patent

Markley

[15] 3,661,267
[45] May 9, 1972

[54] SOLID FILTERS
[72] Inventor: Finley W. Markley, Naperville, Ill.
[73] Assignee: The United States of America as represented by the United States Atomic Energy Commission
[22] Filed: Nov. 3, 1970
[21] Appl. No.: 86,444

[52] U.S. Cl. .........................................210/510, 260/2.5 EP
[51] Int. Cl. .........................................................B10d 39/14
[58] Field of Search..................55/DIG. 5, DIG. 16; 210/496, 210/497, 510; 260/2.5 EP; 264/41, 48, 54

[56] References Cited

UNITED STATES PATENTS

| | | |
|---|---|---|
| 3,275,587 | 9/1966 | Weller et al.........................260/2.5 EP |
| 3,293,174 | 12/1966 | Robjohns...........................210/510 X |
| 3,299,168 | 1/1967 | Payne.............................260/2.5 EP X |

Primary Examiner—Reuben Friedman
Assistant Examiner—R. W. Burks
Attorney—Roland A. Anderson

[57] ABSTRACT

A rigid open-cell plastic foam body useful, for example, as a filter is prepared by mixing equal parts of a diglycidal ether of bisphenol A epoxy resin and the reaction product of an excess of a polyfunctional amine and a polyfunctional fatty acid with two parts of water while avoiding the entrapment of air in the mixture to form an emulsion in which water is the continuous phase, casting the emulsion in the desired form and curing the emulsion.

4 Claims, 1 Drawing Figure

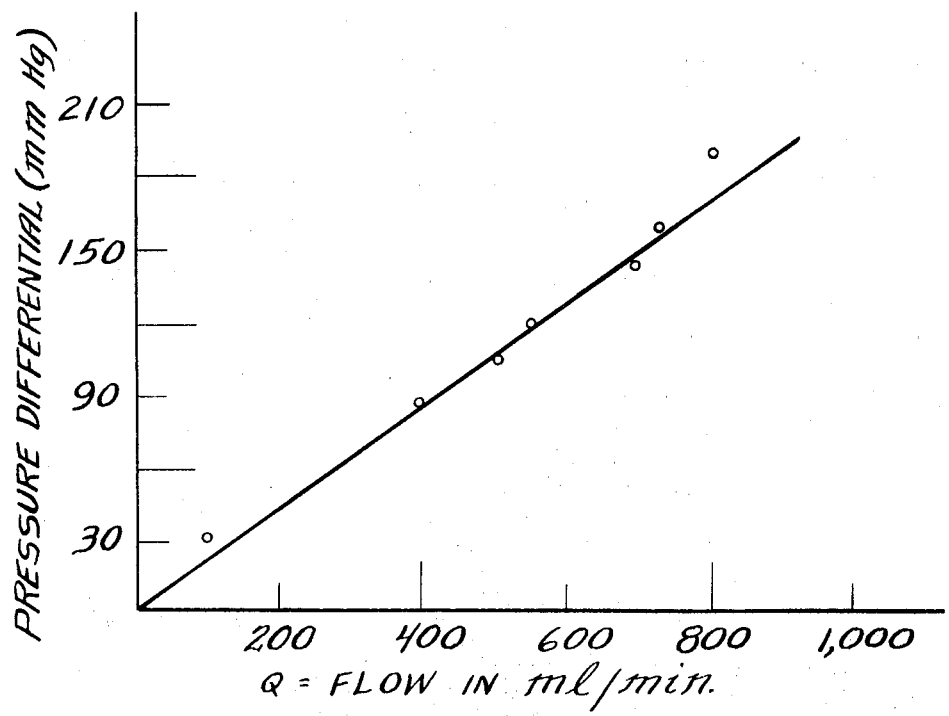

SOLID FILTERS

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a new method of preparing a rigid, open-cell plastic foam. In more detail the invention relates to a very simple method of preparing a shaped body formed of a rigid open-cell plastic foam. The invention also relates to the plastic foam body and specifically to a filter formed of the rigid open-cell plastic foam.

Foamed plastics may be used for a wide variety of purposes since they range in density from 1/20 to 65 pounds per cubic foot; they range in consistency from rigid materials suitable for structural use to flexible substances for soft cushions; and they range in cellular formation from the open or interconnecting cell type to the closed or unicell type. They can thus be used as liquid penetratable materials or as liquid impenetratable materials. A number of methods have been developed to make foamed plastics having this wide variety of characteristics. These methods may be classified in four groups (1) mechanical frothing, (2) dissolving a gas or a low boiling point liquid in the resin from which the plastic foam is prepared, (3) incorporating a foaming or blowing agent which will release an inert gas in the resin when the temperature is increased and (4) sintering a mass of lightweight particles together with or without an adhesive.

The first three procedures listed above inherently form a closed-cell foam since the foam consists of a matrix containing a large number of separate cells filled with air or some other gas while following the fourth procedure, of course, inherently results in the preparation of an open-cell foam. While the fourth procedure is available for preparation of an open-cell foam, it can generally not be used commercially because it is expensive and because of the difficulty of obtaining and maintaining exactly the proper parameters of operation to attain the desired result. Thus most open-cell foams prepared heretofore have been prepared by flexing a closed-cell foam to break the membranes between cells or by heating the foam to accomplish the same result. Such foams continue to retain some barriers between cells and are normally flexible foams rather than rigid foams. Such foams all suffer universally from the fact that the volume of the material expands tremendously with the inclusion of air or gas bubbles therein and thus it is difficult, if not impossible in many cases, to form the foam in a casting of the desired shape. Thus the foam must be preformed and cut to shape. Such procedures also suffer to greater or lesser degree from the problem of maintenance of bubble structure in the foam prior to use.

Since a filter material desirably is of open-cell form to provide the least resistance possible to liquid passing therethrough and should be rigid to support itself in place, a need clearly exists for a new rigid, open-cell plastic foam.

SUMMARY OF THE INVENTION

According to the present invention, a new procedure is employed to prepare a product having characteristics different from any previously known plastic foam which make it exceptionally suitable to serve as a filter. Thus a rigid open-cell epoxy foam can be prepared by mixing approximately equal parts of a diglycidal ether of bisphenol A epoxy resin such as Shell Chemical Company's Epon 828 and of a high molecular weight rather flexible molecule having the ability to act as a surfactant for the epoxy resin such as General Mills Versamid 140 with water to form an emulsion and curing the emulsion. The amount of water used can vary between 25 and 75 percent and the strength of the foam will depend on the percentage of water used. Mixing must be accomplished in such a way that no air is entrapped in the emulsion. The foam may be formed in a casting of the desired shape since no expansion of the foam occurs. The casting has an impervious skin on it and machining is necessary when the material is to be used as a filter.

BRIEF DESCRIPTION OF THE DRAWING

The FIGURE is a graph showing the results of flow tests on the filter body of the present invention.

DESCRIPTION OF THE PREFERRED EMBODIMENT

A rigid, open-cell foam filter was prepared by this process and subjected to flow tests to determine the suitability of the material for this purpose. To prepare the filter 50 grams of Shell Chemical Company's Epon 828 which is a diglycidal ether or bisphenol A epoxy resin and 50 grams of General Mills Versamid 140 which is the reaction product of an excess of a polyfunctional amine and a polyfunctional fatty acid were mixed gently with 100 grams of water to form an emulsion, and the emulsion was cast into a cylindrical form and cured at 75° F. for 24 hours. The cylindrical body thus formed was then machined to remove the impervious skin thereon and to produce a cylinder which was 6.7 cm long, 2 cm in outside diameter and 0.5 cm in inside diameter. Flow tests were then conducted on this filter body to determine the resistivity of the foam to the passage of water therethrough and the figure shows the results thereof. Accordingly, the flow resistivity of the foam is about 6 min/cm and the material is eminently suited to be employed as a filter. If the material is to be used in a water system, it may be so used without drying; if in any other system, it must be dried first. Examination of a cross section of the material through a microscope following drying shows that the material consists of a large number of balls—about 0.001 inch in diameter—fused together to provide a void space of about 25 percent. In view of the method of preparation, the void space is continuous.

It is evident that the process employed is essentially different from the method for the preparation of foamed plastics known as mechanical frothing. In mechanical frothing air or some other gas is beaten into the resin to form the foam; according to the present invention air is positively excluded from the foam either by mixing the mixture in a vacuum or by mixing the mixture very gently. Thus, the foam prepared according to the present invention consists of a cellular material in which the water-filled cells are the continuous phase. The presence of air bubbles therein would adversely effect the uniformity of the body.

A simplified theory explaining how an open-cell construction is obtained when the method of the present invention is used follows:

We may think of an emulsion as consisting of three phases: (1) the dispersed phase, (2) the emulsifier and (3) the continuous phase. Some parts of the emulsifier molecules are soluble in the dispersed phase and other parts are soluble in the continuous phase. They tend, therefore, to form a "-coating" around the discrete droplets of the dispersed phase in an oriented manner which stabilizes the emulsion. Chemical reactions can occur in any one of the three phases or between the dispersed phase and the emulsifier or between the continuous phase and the emulsifier (not considering strictly interfacial reactions). The latter two interactions are possible because the emulsifier is partly dissolved in each of the other two phases.

We should recognize that very large, flexible and complicated emulsifier molecules may be partly dissolved in two different droplets of the dispersed phase. In fact, such connections may occur between one droplet and several adjacent droplets. The result is what may be called a "connected" emulsion.

In the emulsion from which the plastic foam according to the present invention is derived, the plastic resin forms the dispersed phase, a polyamide constitutes the emulsifier and water is the continuous phase. On mixing these constituents an emulsion is formed consisting of very small droplets of resin coated by the emulsifier and dispersed in water. Since the emulsifier is a relatively large molecule having two or more hydrophilic ends and one or more hydrophobic centers, it links adjacent droplets to form a connected emulsion. Upon curing the droplets solidify in the form of a mass of tightly bound together beads with water occupying the space between the beads. This occurs because the resin and the emulsifier polymerize separately or copolymerization occurs. It should be noted at this time that this result is surprising since particles in the dispersed phase having a diameter of about $10^{-3}$ inches are linked by molecules which are no more than $10^{-7}$ to $10^{-8}$ inches in length.

Another possible utility of this material is with a suitable membrane for use in reverse osmosis water purification. The emulsion used to form the open cell plastic of the present invention is placed inside a tube formed of a membraneous material. The end of the tube is then closed and the liquid-filled tube passed between a set of rollers which would distribute the liquid and flatten the tube to the desired thickness. When the liquid had set, the tubes would be assembled in a unit available for water purification.

The embodiments of the invention in which an exclusive property or privilege is claimed are defined as follows:

1. A method of preparing a rigid, open-cell plastic foam comprising mixing an epoxy resin and a polyamide surfactant with water while avoiding the introduction of gaseous bubbles into the mixture to form an emulsion in which water is the continuous phase and curing the emulsion.

2. A method according to claim 1 wherein the epoxy resin is a diglycidal ether of bisphenol A and the surfactant is the reaction product of an excess of a polyfunctional amine and a polyfunctional fatty acid.

3. A method according to claim 2 wherein equal parts of the epoxy resin and the surfactant are mixed to form a solution and the solution is mixed with an equal amount of water.

4. A filter consisting of a cylindrical body formed of an open-cell foam prepared as taught in claim 1.

* * * * *